R. WHITEHILL.
Motor for Sewing-Machines.
No. 225,191. Patented Mar. 2, 1880.
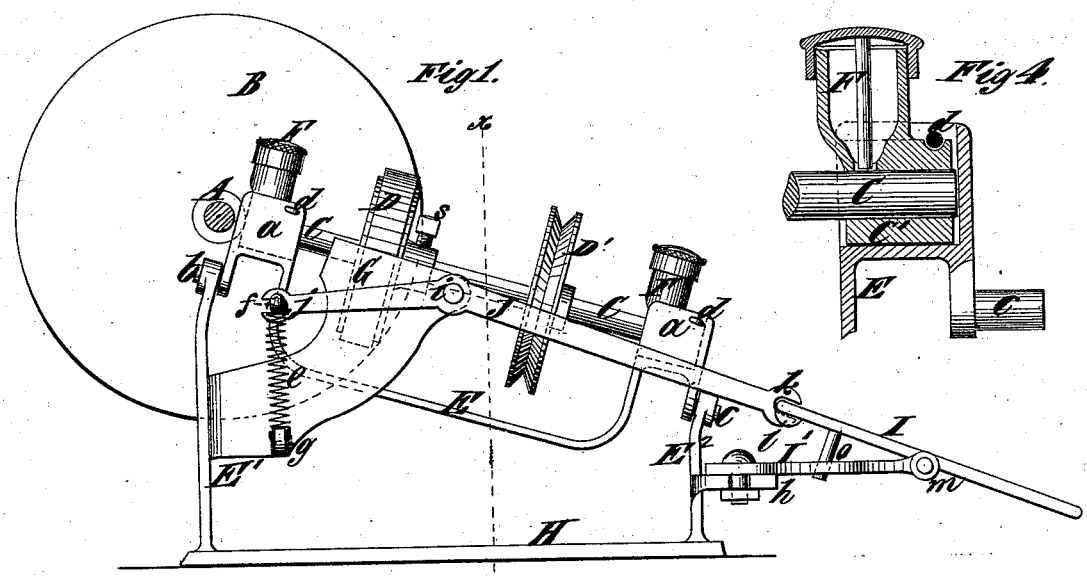
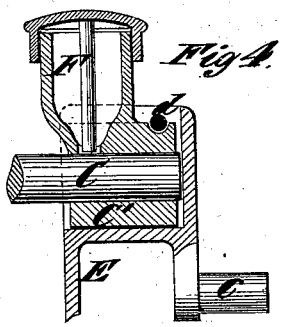
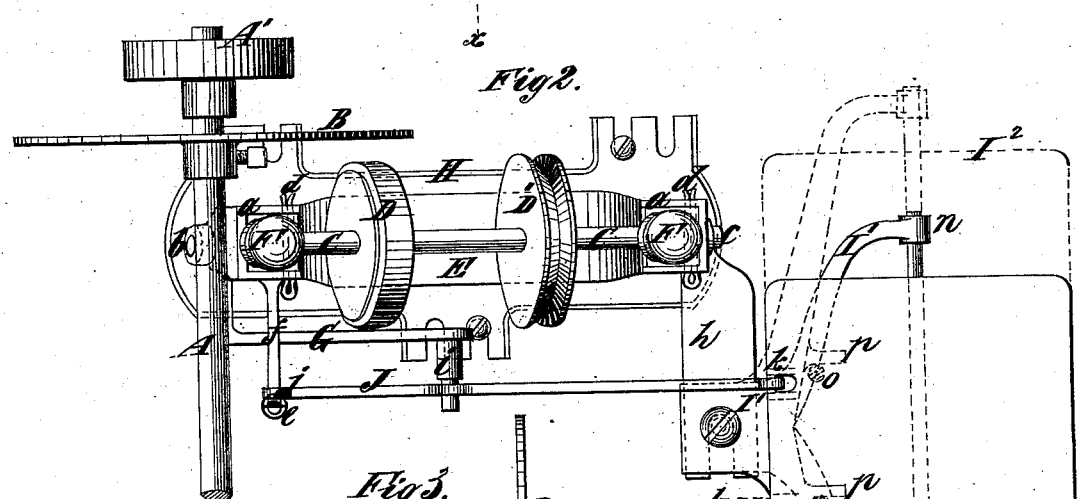
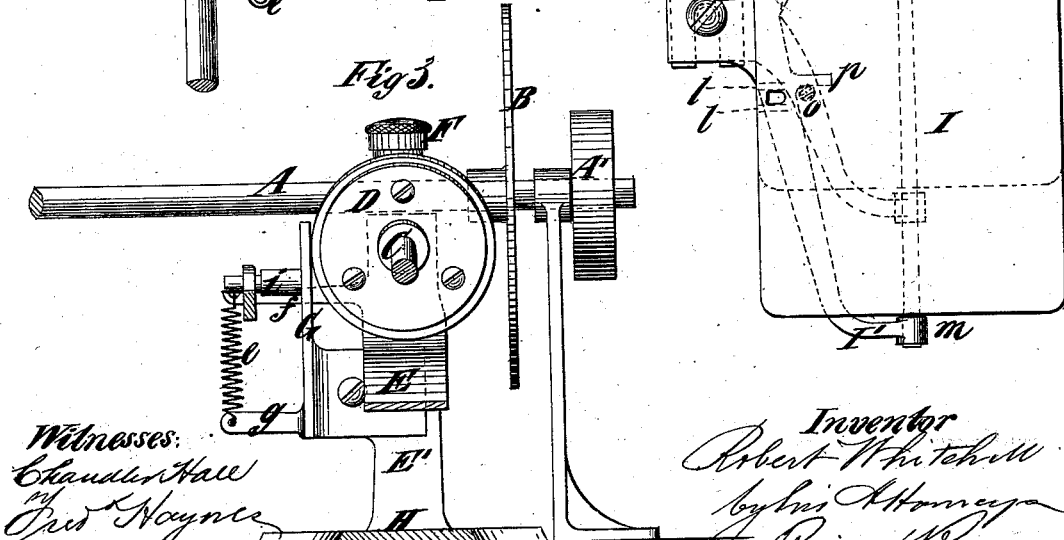
Witnesses:
Chandler Hall
Fred Haynes
Inventor
Robert Whitehill
by his Attorneys
Brown & Brown

UNITED STATES PATENT OFFICE.

ROBERT WHITEHILL, OF NEW YORK, N. Y.

MOTOR FOR SEWING-MACHINES.

SPECIFICATION forming part of Letters Patent No. 225,191, dated March 2, 1880.

Application filed August 7, 1879.

*To all whom it may concern:*

Be it known that I, ROBERT WHITEHILL, of the city of New York, in the county and State of New York, have invented certain new and useful Improvements in Driving Mechanism for Sewing-Machines, of which the following is a specification.

My improvements are particularly intended for driving a number of sewing-machines from one shaft, each of the said machines being connected with said shaft by means of driving mechanism which may be adjusted so as to stop and start the machine at the will of the operator.

The object of my invention is to provide a driving mechanism which may be cheaply manufactured, easily taken apart for shipment or for cleaning, and which is so simple in construction that the several parts may be put together and adjusted by an unskilled person.

My invention consists in the combination, with a friction driving disk or wheel on a driving shaft and a brake, of a counter-shaft carrying a friction-pulley and capable of a lateral movement, by which said pulley may be brought out of contact with the brake and into gear with the said driving disk or wheel, or brought out of gear with said disk or wheel and into contact with the said brake.

It also consists in the combination, with a driving-shaft and a disk or wheel carried thereby, of a laterally-movable counter-shaft arranged transversely to said driving-shaft and carrying a friction-pulley and a treadle so connected with the said counter-shaft that the said friction-pulley may be brought into or out of contact with said disk or wheel.

It also consists in the combination, with such a driving-shaft, disk, counter-shaft, friction-pulley, and treadle, of laterally-movable bearings for said counter-shaft and a stationary brake, whereby the tilting of the treadle in one direction brings the said friction-pulley in contact with said disk or wheel, and the tilting of said treadle in the other direction brings said friction-pulley in contact with said brake.

It also consists in various details and combinations of parts, whereby the simplicity and cheapness of said driving mechanism are increased.

In the accompanying drawings, Figure 1 represents a transverse section of the driving-shaft and a side view of the remaining parts of my mechanism. Fig. 2 represents a plan thereof. Fig. 3 represents a vertical section on line $xx$, Fig. 1; and Fig. 4 represents a longitudinal section on a larger scale of one of the bearings of the counter-shaft.

Similar letters of reference designate corresponding parts in all the figures.

A designates a driving-shaft, which is of sufficient length to drive a number of sewing-machines, and which is generally arranged below a table on which the machines are placed. Motion may be imparted to it by a pulley, A'.

B designates a disk or wheel secured upon said shaft in proper position to drive a sewing-machine.

C designates a counter-shaft arranged transversely to the driving-shaft A, and carrying a friction-pulley, D, which is preferably formed of several thicknesses of sole-leather arranged upon the shaft and bolted between metal flanges.

D' designates a pulley mounted on the shaft C, by which motion may be imparted through a belt to the shaft of the sewing-machine. When it is desired to vary the speed the set-screw $s$ may be loosened and the said pulley D adjusted toward or from the shaft A.

The shaft C is held in bearings which are capable of lateral adjustment, so as to move the friction-pulley D into or out of contact with the side of the disk or wheel B. In order to effect such adjustment the bearing-blocks C' are represented as held in sockets or recesses $a$ in a frame-work, E, which is pivoted at $b$ and $c$, so as to permit of its free oscillation.

As the frame E is pivoted below the center of the shaft C, its oscillation will adjust the pulley D toward and from the disk or wheel B.

As the bearing-blocks C' are fitted in the sockets or recesses $a$, the shaft C is held against longitudinal movement by the walls of such sockets, and hence the shaft C may be made without shoulders or collars. The bearing-blocks C' are held against vertical displacement by pins $d$ inserted across the sockets $a$.

F designates an oil-cup of peculiar construction, which, though it forms no part of the present invention, may be made the subject of a future application for a patent.

G designates a brake, which is represented as stationary, being attached to and extending from a standard, E', and arranged in such a position that the pulley D, when moved away from the disk B, may be forced against it to stop its rotation.

A spring, e, fastened at one end to an arm, f, extending from the frame E, and at the other to a projection, g, extending from the brake G, serves to draw the pulley D, when not otherwise actuated, out of contact with the disk or wheel B.

H designates a base-plate, to which the standards E' E² are secured, and which serves to secure the apparatus to the floor.

I designates a treadle, pivoted at about its center in a hanger or bracket, I', which is bolted to a piece, h, extending from the standard E².

J designates a lever, pivoted loosely on a pin, i, extending from the brake G and forked at both ends, j k. The end j engages with the arm f, and the end k with the treadle I, which has two lugs, l, for preventing displacement of the end of the lever sidewise.

It is desirable that the treadle should at all times be about central below the needle of the machine, while the pulley D' is in line with the pulley on the needle-operating shaft of the machine.

As here represented, the treadle is adjusted for a machine in which the pulley to which motion is imparted from the pulley D' is at some distance from the needle. In case the apparatus is to be used with a machine in which the pulley on the needle-operating shaft is nearer the needle, the hanger I' may be reversed, and it and the treadle shifted into the position shown in dotted outline at I², Fig. 2.

In order to permit the ready removal of the treadle I from the hanger I', the latter is made considerably longer than the said treadle, so as to permit the treadle to be slipped endwise sufficiently to disengage its fulcrum from the bearing m, and the bearing n is made slightly conical for this purpose. When in operation accidental displacement of the treadle is prevented by a pin, o, extending from said treadle, impinging against a projection, p, on the hanger I', and said pin and projection are so arranged that they act in either position of the treadle I, as represented in Fig. 2.

By the oscillation of the treadle the pulley D may be adjusted into contact with the disk or plate B for driving the machine, or forced against the brake for stopping the same.

When it is desired to take the apparatus apart for shipment or cleaning, the pins d are first taken out to permit the removal of the shaft C. After this is done the treadle may be tilted sufficiently to disengage it from the lever J, and the pin o from the projection p. The treadle may be then removed by slipping it longitudinally, and the said lever may be readily slipped off the pin i and removed.

What I claim as my invention, and desire to secure by Letters Patent, is—

1. The combination, with a driving-shaft and a disk or plate carried thereby, of a laterally-movable counter-shaft arranged transversely to said driving-shaft and carrying a friction-pulley, and a treadle so connected with said laterally-movable counter-shaft that the said friction-pulley may be brought into or out of contact with said disk or plate, substantially as specified.

2. The combination, with a friction driving disk or wheel on a driving-shaft and a brake, of a counter-shaft carrying a friction-pulley and capable of a lateral movement, by which said pulley may be brought out of contact with the brake and into gear with the said disk or wheel, or out of gear with said disk or wheel and into contact with the said brake, substantially as specified.

3. The combination, with a driving-shaft and a disk or plate carried thereby, of a counter-shaft extending transversely to said driving-shaft and carrying a friction-pulley, laterally-movable bearings for said counter-shaft, a brake, and a treadle so connected with the said bearings that the friction-pulley may be brought into contact with said disk or plate or said brake, substantially as specified.

4. The combination, with the driving-shaft A, disk or plate B, and the brake G, of the shaft C, carrying the friction-pulley D, and mounted in bearings in an oscillating frame, E, whereby the said pulley may be adjusted into contact either with the disk or plate, or with the said brake, substantially as specified.

5. The combination, with the shaft A and disk or plate B, of the counter-shaft C, friction-pulley D, oscillating frame E, lever J, and treadle I, substantially as specified.

6. The combination, with the counter-shaft C, of the oscillating frame E, provided with sockets or cavities for the reception of the bearing-blocks C', whereby said longitudinal movement of the said shaft is prevented, substantially as specified.

7. The combination, with the oscillating frame E, of the lever J, mounted loosely on the pin i, and having at one end a fork engaging with the arm f, extending from the said frame E, and at the other end a fork engaging with the treadle I, substantially as specified.

8. The combination, with the treadle I, of the reversible hanger or bracket I', substantially as and for the purpose specified.

9. The combination, with the hanger or bracket I' and the treadle I, adapted to be removed therefrom by a longitudinal movement, of the pin o, extending from the said treadle and engaging with the projection p upon the said hanger, whereby such longitudinal movement is prevented, substantially as specified.

ROBERT WHITEHILL.

Witnesses:
HENRY T. BROWN,
FREDK. HAYNES.